March 9, 1926.                    1,576,019
S. ZIMETBAUM
MOLDING APPARATUS
Filed July 18, 1924          2 Sheets-Sheet 1
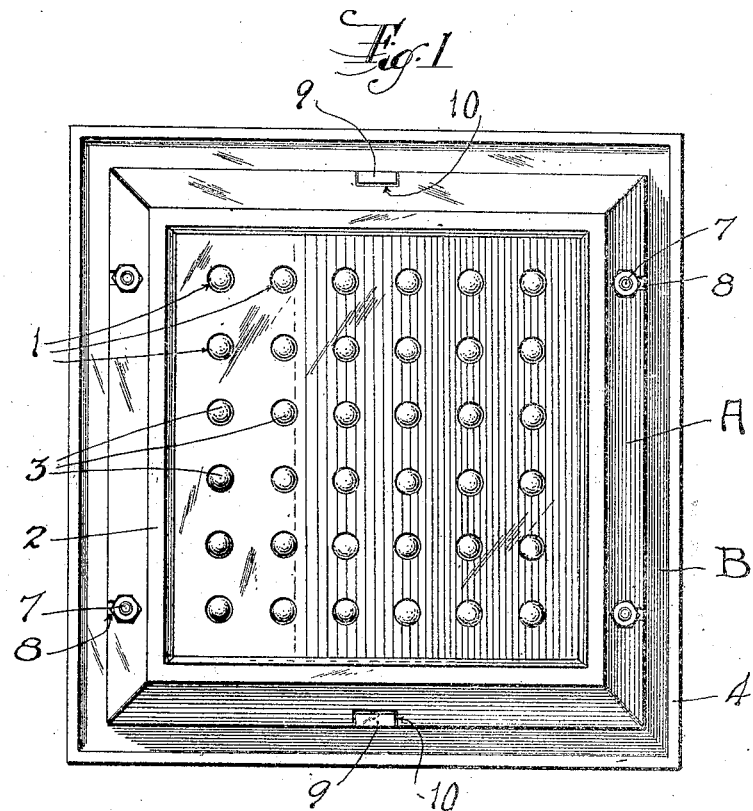
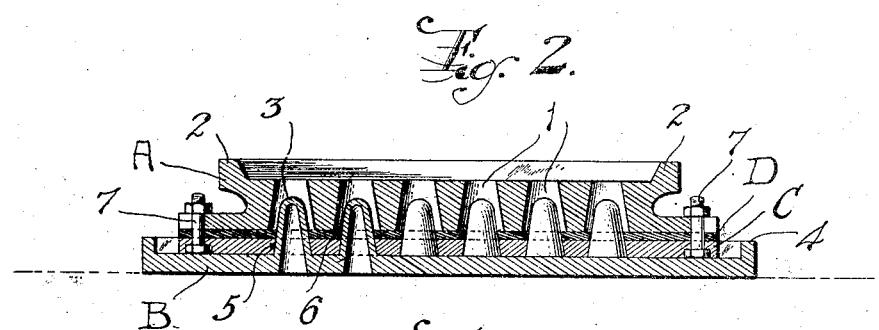
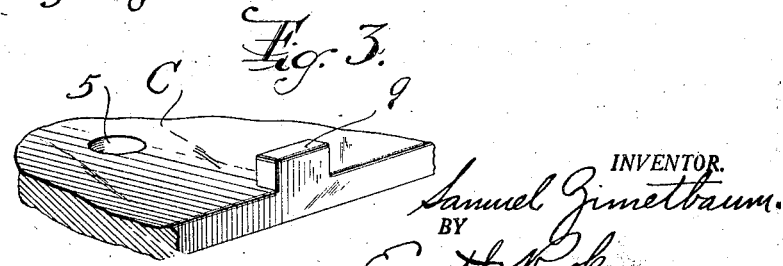
INVENTOR.
Samuel Zimetbaum.
BY
Everett V. Rook, ATTORNEYS.

March 9, 1926.                    S. ZIMETBAUM                    1,576,019
                                MOLDING APPARATUS
                              Filed July 18, 1924          2 Sheets-Sheet 2

INVENTOR.
Samuel Zimetbaum
BY
Everett Cook, ATTORNEYS.

Patented Mar. 9, 1926.

1,576,019

UNITED STATES PATENT OFFICE.

SAMUEL ZIMETBAUM, OF NEWARK, NEW JERSEY.

MOLDING APPARATUS.

Application filed July 18, 1924. Serial No. 726,741.

*To all whom it may concern:*

Be it known that I, SAMUEL ZIMETBAUM, a citizen of the United States, and a resident of Newark, in the county of Essex and State of New Jersey, have invented new and useful Improvements in Molding Apparatus, of which the following is a specification.

This invention particularly relates to apparatus for molding cup-shaped articles, one object of the invention being to provide a novel and improved apparatus especially adapted for molding cups of jelly or like substances.

The underlying idea of my invention is to provide a novel confection or article of food consisting of for instance ice cream served in an edible jelly cup so that the ice cream and the cup may be eaten together and each thereby complement the flavor of the other. I am aware that edible jelly, such as fruit jelly, has been molded in various forms, but to my knowledge such jelly has not heretofore been molded in the form of a cup.

Another object of the invention is to provide apparatus of the character described embodying a flask-plate or matrix plate with matrices or article-forming openings, a core plate having cores to enter the matrices of the matrix plate, and means between said matrix or flask-plate to prevent the jelly or like substance in its liquid form from escaping around the cores from the matrices.

Further objects are to provide in such apparatus a novel and improved construction, combination and arrangement of parts whereby the apparatus may be quickly disassembled and the cups removed without danger of injury to the cups; to provide apparatus of this character whereby the jelly or like substance may be poured simultaneously into all of the openings or matrices with no waste of material, and to obtain other results and advantages as may be brought out by the following description.

Referring to the accompanying drawings, in which the same characters of reference designate corresponding and like parts throughout the several views, Figure 1 is a top plan view of a molding apparatus embodying the invention;

Figure 2 is a transverse vertical sectional view through the apparatus;

Figure 3 is a fragmentary perspective view of a portion of the stripping plate showing one of the lugs for positioning the flask-plate on the stripping plate;

Figure 4:
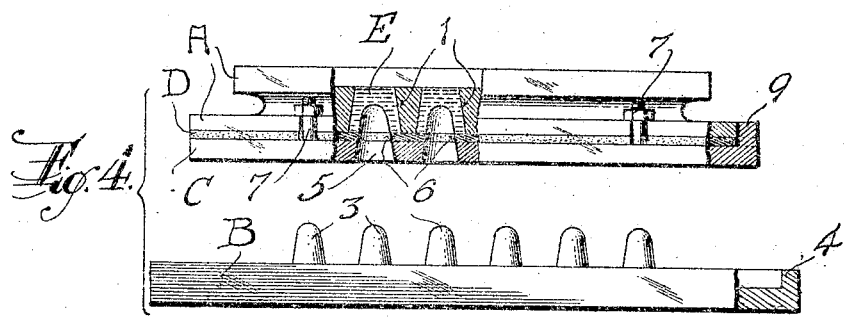
Figure 4 is a composite view partially in section, showing the manner of removing the cores from the openings in the flask-plate.

Specifically describing the illustrated embodiment of the invention, the reference character A designates a matrix plate or flask-plate, B a core plate, C a stripping plate and D a packing sheet.

The flask-plate A is provided with a plurality of transverse openings or matrices 1 which extend entirely through the plate, and the upper side of the plate is provided with a peripheral rib or flange 2 surrounding all of the openings 1. In the present instance, these openings are flared toward the bottom of the flask-plate to provide a tapering or flaring shape for the cup to be molded. The core plate B is provided at one side thereof with a plurality of projections or cores 3, one adapted to loosely enter each of the openings 1 in spaced relation thereto as clearly shown in Figure 2. Preferably these cores 3 are formed integral with the plate, and the same side of the plate is provided with a perimetral flange 4 for a purpose hereinafter described.

The stripping plate C is a substantially flat sheet of metal provided with transverse openings 5 one adapted to snugly receive each of the cores 3 outwardly of the flask-plate A. The packing sheet D is preferably formed of rubber or similar elastic material and is provided with a plurality of openings 6 one to tightly receive each of the cores 3, as shown in Figure 2. This packing sheet is interposed between the stripping plate C and the bottom side of the flask-plate A, and bolts 7 are mounted in the stripping plate and adapted to pass through slots 8 in the flask-plate to connect the stripping plate with the flask-plate for compressing the packing sheet D.

The stripping plate C also serves to center the openings 1 of the flask-plate relatively to the cores 3, and in the present instance the stripping plate is shown as provided at two opposite sides thereof with lugs 9 to cooperate with corresponding notches 10 in the edges of the flask-plate. With the lugs 9 arranged within the notches 10, the openings 5 of the stripping plate are centered with respect to the openings 1 of the flask-plate, and when the molding apparatus is assembled the cores 3 pass through the openings 5 of the stripping plate so that they are thereby centered in the openings 1. It will be understood that in assembling the mold the stripping plate C and the flask-plate A are connected by the bolts 7 with the packing strip D between them. These three parts thus assembled are then positioned over the core plate with the cores 3 arranged in the openings 1 of the flask-plate as shown in Figures 1 and 2.

Figure 5:
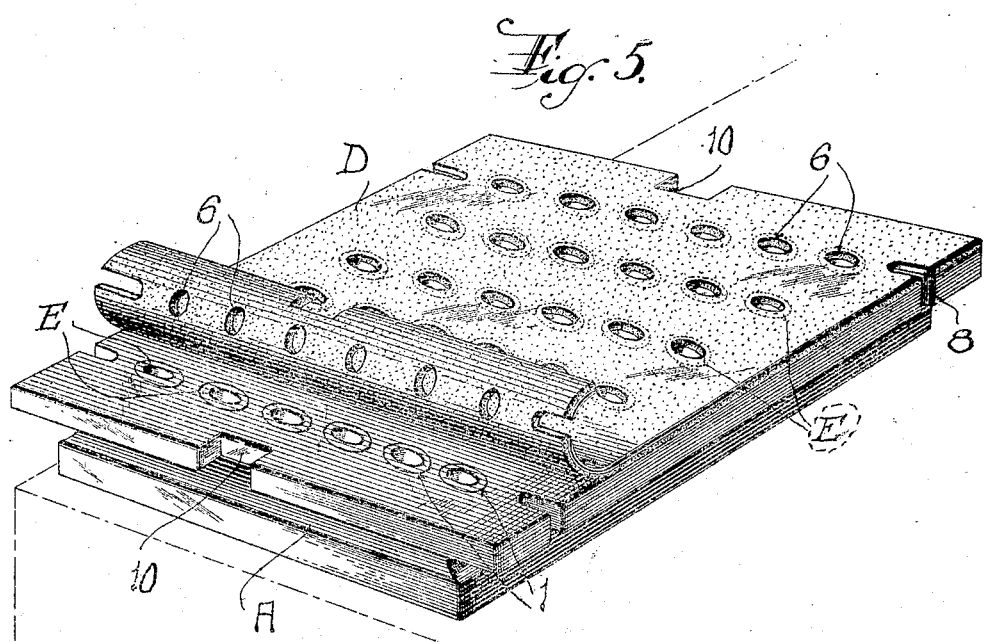
Figure 5 is an inverted perspective view of the flask-plate with the stripping plate removed, showing the relation of the rubber packing sheet to the openings in the flask-plate and the manner of removing the said packing sheet.
Figure 6:
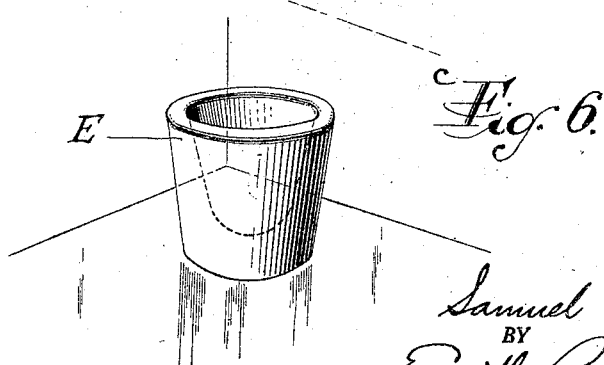
Figure 6 is a perspective view of one of the jelly cups for the molding of which the apparatus is designed.

The substance to be molded, in the present instance jelly, is always practically in liquid form just before it is permitted to harden, and the substance in this form is poured into the depression on the top of the flask-plate formed by the rib 2. It will be understood that the walls of the openings 1 and the cores 3 will be moistened with water as is customary in molding jelly, before the substance is poured into the openings. The liquid thus flows simultaneously into all of the openings 1 around the cores 3, and the capacity of the openings 1 may be so calculated that the exact necessary amount of substance will be poured therein. No particular attention of the operator is necessary in filling the openings 1, so that the speed of the operation is comparatively great. The packing sheet D prevents the liquid substance from flowing from the openings 1 around the cores 3 and between the flask-plate and the stripping plate. Any of the substance which may happen to leak from the openings 1 or be spilled in the pouring operation will be collected within the flange 4 of the core plate. After the jelly has set in the openings 1, the flask-plate with the connected stripping plate and packing sheet, are raised from the core plate, or the core plate separated from the stripping plate. This action removes the cores 3 from the openings 1, and the packing sheet D and the stripping plate C protect the edges of the jelly cup within the openings as the cores are removed. The next operation is to remove the stripping plate C which is done by taking off the nuts from the bolts 7. The flask-plate may then be inverted and the rubber packing sheet D peeled off, as shown in Figure 5, after which the jelly cups E may be removed from the openings 1 by again turning the flask-plate right side up or by pushing the cups upwardly from the openings.

Obviously the apparatus is susceptible of many modifications and changes without departing from the spirit or scope of the invention. Therefore, I do not desire to be understood as limiting myself except as required by the following claims when construed in the light of the prior art.

Having thus described the invention, what I claim is:

1. A molding apparatus comprising a flask-plate having an opening therethrough, a core plate having a core to loosely enter said opening from the bottom thereof, and a stripping plate interposed between said core plate and said flask-plate and having an opening to snugly receive said core to hold the article in said opening in the flask-plate when said core plate is removed.

2. A molding apparatus comprising a flask-plate having an opening therein, a core plate having a core to enter said opening from one end thereof, a stripping plate interposed between said core plate and said flask-plate and having an opening to snugly receive said core to hold the article in said opening in the flask-plate when said core plate is removed, and means for separably fastening together said flask-plate and said stripping plate.

3. A molding apparatus comprising a flask-plate having an opening therein, a core plate having a core to enter said opening from one end thereof, and a packing sheet interposed between said core plate and said flask-plate and formed with an opening to tightly fit around said core to prevent leakage of the substance being molded in said opening in the flask-plate outwardly around said core and between said plates.

4. A molding apparatus comprising a flask-plate having an opening therein, a core plate having a core to enter said opening from one end thereof, packing means interposed between said core plate and said flask-plate to prevent leakage of the substance being molded in said opening in the flask-plate outwardly around said core and between said plates, and clamping means for compressing said packing means.

5. A molding apparatus comprising a flask-plate having an opening therein, a core plate having a core to enter said opening from one end thereof, a stripping plate having an opening to snugly receive said core outwardly of said flask-plate, a compressible packing means interposed between said stripping plate and said flask-plate to tightly fit around said core, and clamping means for connecting said stripping plate and said flask-plate to compress said packing means to prevent leakage of the substance being molded from said opening in the flask-plate outwardly around said core and between said plates.

6. A molding apparatus comprising a flask-plate having an opening therein, a core plate having a core to enter said opening from one end thereof, a stripping plate having an opening to snugly receive said core outwardly of said flask-plate, a rubber sheet having an opening to tightly fit around said core, and clamping means for connecting said stripping plate and said flask-plate to compress said rubber sheet to prevent leakage of the substance being molded from said opening in the flask-plate outwardly around said core and between said plates.

7. A molding apparatus comprising a flask-plate having a plurality of transverse openings therethrough, a rib on its top side around said openings, and a core plate having cores to enter said openings from the lower ends thereof, whereby the substance to be molded can be poured simultaneously into all of said openings around said cores.

8. A molding apparatus comprising a flask-plate having a plurality of transverse openings therethrough, a rib on its top side around said openings, and a core plate having cores to enter said openings from the lower ends thereof, whereby the substance to be molded can be poured simultaneously into all of said openings around said cores, a stripping plate having a plurality of openings one to receive each of said cores so that portions of said stripping plate cooperate with said cores to close the lower ends of said openings in the flask-plate, an elastic packing sheet interposed between said flask-plate and said stripping plate and formed with openings to yieldingly receive said cores, and clamping means connecting said stripping plate and said flask-plate and compressing said elastic packing sheet to prevent leakage of substance from the openings in said flask-plate around said cores and between said plates.

SAMUEL ZIMETBAUM.